C. J. GOBLE.
CUTTER BAR FOR LAWN MOWERS.
APPLICATION FILED AUG. 5, 1916.
1,229,253.
Patented June 12, 1917.
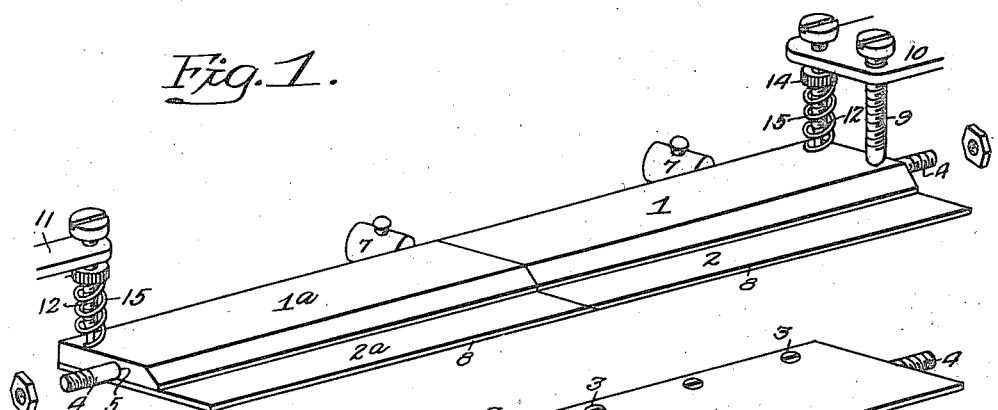
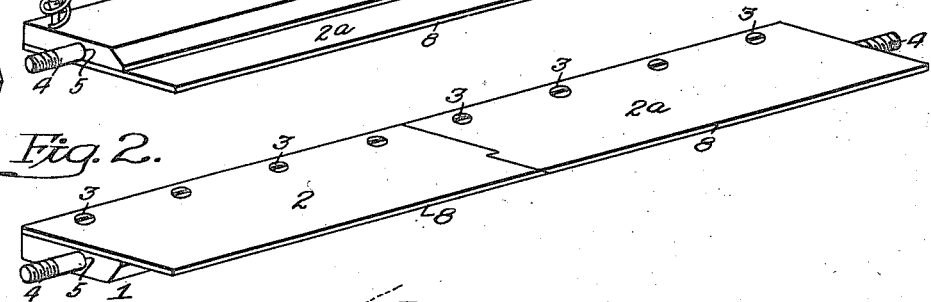
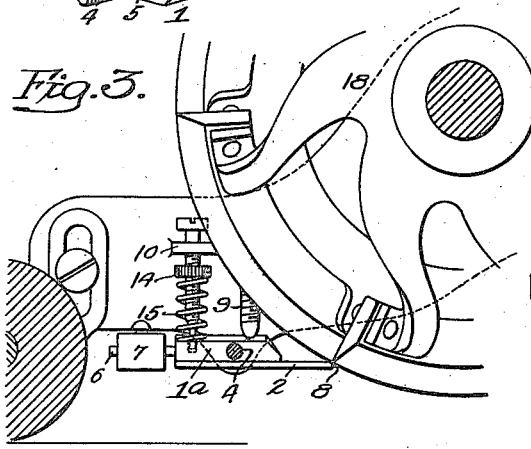
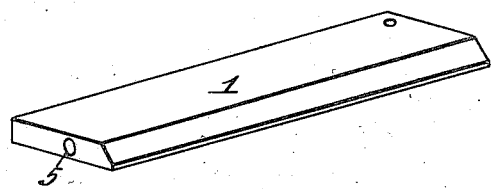
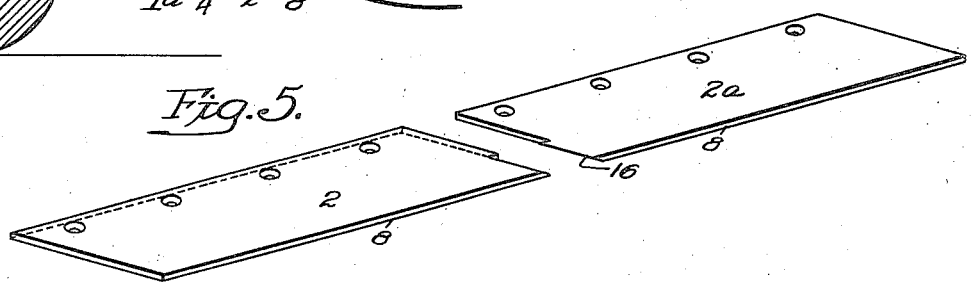
Inventor:-
Charles J. Goble
by his Attorneys
Howson & Howson

UNITED STATES PATENT OFFICE.

CHARLES JACOB GOBLE, OF SOMERVILLE, NEW JERSEY.

CUTTER-BAR FOR LAWN-MOWERS.

1,229,253.　　　　　Specification of Letters Patent.　　Patented June 12, 1917.

Application filed August 5, 1916.　Serial No. 113,376.

*To all whom it may concern:*

Be it known that I, CHARLES JACOB GOBLE, a citizen of the United States, and a resident of Somerville, county of Somerset, State of New Jersey, have invented certain Improvements in Cutter-Bars for Lawn-Mowers, of which the following is a specification.

My invention relates to lower knives or cutter bars for lawn mowers, and one object is to provide a cutter bar which will automatically adjust itself to maintain contact with the reel or wiper blades and which will automatically take up any wear either of itself or of the reel. Another object is to provide a cutter bar which may be easily removed and sharpened and which, in replacing, will present none of the difficulties of adjustment commonly found in the ordinary form of cutter bar.

In the accompanying drawings:

Figure 1 is a view showing the cutter bar in perspective;

Fig. 2 is a perspective view showing the under side of the bar;

Fig. 3 is a view showing the bar in side elevation;

Fig. 4 is a perspective view showing one section of the body casting; and

Fig. 5 is a detached perspective view showing the details of the blade of the cutter bar.

According to my invention, the body of the cutter bar is cast in two parts, 1 and 1ª, which increase in thickness from end to end, and which together form an even taper. The parts of this body portion are formed in such a manner that the division between them is in a plane perpendicular to the top surface of the casting. The knife blade is also made in two parts, 2 and 2ª, and is attached to the body portion by means of the screw 3. As shown in Fig. 5, the rear half of the division between the blade sections is such that, when the parts of the cutter bar are assembled, the line of division will be in the same plane as the division between the body castings. The front half of the division of the blade is in the form of a mortise or miter, one section having a wedge shaped projecting portion 16 and the other having a correspondingly formed recess.

The cutter bar is mounted on a rod 4 which runs through a passage 5 in the body castings parallel to their upper surfaces and which has its ends mounted in bearings on the side plates of the lawn mower. This rod forms an axis around which the bar may revolve. It will be noticed that the two parts of the cutter bar can swing independently around the rod although their relative movement is limited to a certain extent by the mitered section of the blade.

Projecting from the backs of the body castings are arms 6 bearing weights 7 which may be adjusted on the arms to any desired position. These weights tend to pull the back of the bar downward around the rod 4 and so force the front and cutting edge of the blade against the reel 18. This upward tendency at the front is limited by a set-screw 9 held by a lug 10 on the side plate of the mower.

On the opposite side plate is a lug 11 which holds a special screw 12, shown in Figs. 1 and 3. This screw is threaded part way down, as shown, and its unthreaded lower end fits loosely into a hole at the rear of the upper face of the casting 1ª. On the threaded section of the screw, below the lug 11, is a regulating nut 14 which acts as a collar for a spring 15 interposed between the nut and the surface of the bar. This spring tends to force the cutting edge 8 upward against the reel, and so operates in conjunction with the weights 7. The tension of the spring may be regulated by means of the nut 14, and may be adjusted to eliminate any vibration of the cutter bar, while the screw itself positively limits the downward swing of the cutting edge by contact with the back of the bar. There may be a similar screw and spring at the other end of the bar in which case the weights at the back may be dispensed with and the springs relied upon to force the cutting edge against the reel.

When in position on the lawn mower, the cutter bar will be slightly inclined to the horizontal axis of the mower due to the before mentioned taper of the body portion. The tapered body gives an upward slant to the cutting edge while, at the same time, it is possible for the cutter bar to swing on a horizontal axis. By means of this upward slant of the cutting edge and the divided bar, a continuous positive contact between the reel members and the cutting edge is made possible and any irregularities in either bar or reel members are thus taken care of. Under operative conditions the reel members first come in contact with the cutter bar at its lower end—in Fig. 1, at the outside of the cutting edge 8 of the part 2—and as the reel revolves their point of contact advances along the cutting edge toward the center, depressing the front side of the bar around the bar 4. Owing to the interlocking of the mitered section of the blade, the part 1a is carried down with the part 1. When the point of contact has passed the division of the cutter bar, the first part 1 swings up into normal position due to the weight 7 or the spring 15 or both, as the case may be, and is ready to receive the next following reel member. The other part of the bar, 1a, continues to be depressed by the initial reel member until the point of contact reaches the end of the cutting edge, when this part, too, swings back to normal position as defined by the screw 9, or until it strikes the part 1 over which the next reel member has begun to pass. The mitering of the blade excludes all possibility of the reel members catching on and being injured by the section 2a as they pass over the division of the blade.

It should be understood that these cutter bars may be made and sold as independent articles of manufacture to replace other forms of cutter bar on lawn mowers.

I claim:

1. In a lawn mower, the combination with a rotary cutting member of a cutter bar having a plurality of sections co-acting with said cutting member.

2. In a lawn mower, the combination with a rotary cutting member of a cutter bar having a plurality of sections co-acting with said rotary cutting member, each section being so mounted as to be adjustable to the rotary cutting member.

3. In a lawn mower, the combination with a rotary cutting member of a cutter bar composed of a plurality of independent sections, and means for adjusting the sections of the cutter bar to said rotary cutting member.

4. In a lawn mower, the combination with a rotary cutting member of a cutter bar composed of a plurality of independent sections, means for adjusting the sections of the cutter bar to said rotary cutting member, and means for regulating the pressure of the sections on said rotary cutting member.

5. In a lawn mower, the combination with a rotary cutting member of a pivotally mounted cutter bar having a plurality of independent sections, and means for adjusting the cutting edge of the cutter bar to said rotary cutting member.

6. In a lawn mower, the combination with a rotary cutting member of a rod, a cutter bar having a plurality of independent sections mounted on said rod, and means for adjusting the cutting edge of said cuttter bar to said cutting member.

7. In a lawn mower, the combination with a rotary cutting member of a pivotally mounted cutter bar having a plurality of independent sections, means for holding the cutting edge of said bar in flexible contact with said cutting member, and means for limiting the movement of said cutting edge in the direction of and away from the rotary cutting member.

8. In a lawn mower, the combination with a rotary cutting member of a pivotally mounted cutter bar consisting of a plurality of independent sections, springs at the rear of said bar for forcing the forward edge thereof against said cutting member, means for adjusting the pressure of said springs, and means for limiting the movement of said forward edge of the bar in the direction of the cutting member.

9. In a lawn mower, the combination with a rotary cutting member of a pivotally mounted cutter bar comprising a plurality of independent sections, arms at the rear of said bar, and weights adjustably mounted on said arms.

10. In a lawn mower, the combination with a rotary cutting member of a pivotally mounted cutter bar comprising a plurality of independent sections, arms at the rear of said bar, weights adjustably mounted on said arms, and a spring which coöperates with said weights in tending to force the forward edge of the cutter bar against said cutting member.

11. In a lawn mower, the combination with a rotary cutting member of a pivotally mounted cutter bar composed of a plurality of independent sections, the cutting edge of said bar slanting upward from one side of the mower to the other, means on each section for depressing the abutting section as said first section is being depressed by said cutting member, and means for returning the sections to their normal positions after they have been disengaged by said cutting member.

12. A cutter bar for lawn mowers made in independently adjustable sections and having a continuous cutting edge.

13. A cutter bar for lawn mowers made in sections and having a continuous cutting edge and means for independently adjusting the sections to the reel of the mower.

14. A cutter bar for lawn mowers consisting of a plurality of abutting sections, the end of one section having a portion cut substantially perpendicular to the plane of the bar and a second portion cut at an angle thereto, and a second section having its adjacent end formed to be complementary to the end of said first section.

15. A cutter bar consisting of an elongated body increasing in thickness from one end to the other, with a blade connected to said body.

16. A cutter bar consisting of an elongated body increasing in thickness from one end to the other and made in a plurality of sections, with a blade made in a plurality of sections respectively connected to the body sections.

CHARLES JACOB GOBLE.